United States Patent
Doerr et al.

(10) Patent No.: US 9,103,987 B2
(45) Date of Patent: *Aug. 11, 2015

(54) OPTICAL AMPLIFIER FOR MULTI-CORE OPTICAL FIBER

(71) Applicant: Alcatel-Lucent USA, Inc., Murray Hill, NJ (US)

(72) Inventors: Christopher Doerr, Middletown, NJ (US); Peter Winzer, Aberdeen, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 82 days.

This patent is subject to a terminal disclaimer.

(21) Appl. No.: 13/967,570

(22) Filed: Aug. 15, 2013

(65) Prior Publication Data

US 2015/0049379 A1     Feb. 19, 2015

Related U.S. Application Data

(63) Continuation of application No. 13/012,730, filed on Jan. 24, 2011, now Pat. No. 8,548,291.

(60) Provisional application No. 61/428,154, filed on Dec. 29, 2010.

(51) Int. Cl.
*G02B 6/30*     (2006.01)
*G02B 6/42*     (2006.01)
(Continued)

(52) U.S. Cl.
CPC ............ *G02B 6/30* (2013.01); *G02B 6/3684* (2013.01); *G02B 6/429* (2013.01); *H01S 3/094053* (2013.01)

(58) Field of Classification Search
CPC .......... G02B 6/30; G02B 6/305; G02B 6/429
USPC ............................................. 385/49
See application file for complete search history.

(56) References Cited

U.S. PATENT DOCUMENTS 3,985,423 A    10/1976   Tseng
5,123,068 A *   6/1992   Hakoun et al. ................. 385/14
(Continued)

FOREIGN PATENT DOCUMENTS

CN         1157687 A     8/1997
JP        S62118310 A     5/1987
(Continued)

OTHER PUBLICATIONS

Foreign Communication From a Related Counterpart Application, Chinese Application No. 201180061426.2, Chinese Office Action dated Aug. 7, 2014, 5 pages.
(Continued)

*Primary Examiner* — Ari M Diacou
(74) *Attorney, Agent, or Firm* — Hitt Gaines, P.C.

(57) ABSTRACT

An optical device comprising a first optical coupler located over a surface of a substrate such that the optical coupler is able to end-couple to an optical core of a first optical fiber having an end facing and adjacent to the first optical coupler and the surface. The optical device further comprises a second optical coupler located over the surface such that the second optical coupler is able to end-couple to an optical core having an end facing and adjacent to the second optical coupler. The optical device also comprises a pump coupler being configured to couple pump light to an optical path that connects the first optical coupler and the second optical coupler.

20 Claims, 11 Drawing Sheets

(51) Int. Cl.
*G02B 6/36* (2006.01)
*H01S 3/094* (2006.01)

(56) References Cited

U.S. PATENT DOCUMENTS

| | | | |
|---|---|---|---|
| 5,442,723 A * | 8/1995 | Vinchant et al. | 385/129 |
| 6,275,317 B1 * | 8/2001 | Doerr et al. | 398/201 |
| 6,321,001 B1 * | 11/2001 | Heflinger | 385/24 |
| 6,377,396 B1 * | 4/2002 | Sun et al. | 359/341.42 |
| 6,467,969 B1 * | 10/2002 | Shmulovich | 385/54 |
| 6,487,329 B2 | 11/2002 | Foltzer | |
| 6,594,420 B1 | 7/2003 | Lange et al. | |
| 6,687,043 B2 * | 2/2004 | Davies | 359/334 |
| 6,696,917 B1 | 2/2004 | Heitner et al. | |
| 7,206,473 B2 | 4/2007 | Mino et al. | |
| 7,565,047 B2 * | 7/2009 | Nishizawa et al. | 385/33 |
| 7,845,860 B2 * | 12/2010 | Fiorentino et al. | 385/89 |
| 8,548,291 B2 * | 10/2013 | Doerr et al. | 385/49 |
| 8,837,878 B2 * | 9/2014 | Chen et al. | 385/32 |
| 2002/0044718 A1 | 4/2002 | Nishi et al. | |
| 2002/0110328 A1 * | 8/2002 | Bischel et al. | 385/49 |
| 2003/0016439 A1 * | 1/2003 | Courtois et al. | 359/337.4 |
| 2003/0185514 A1 * | 10/2003 | Bendett et al. | 385/48 |
| 2003/0228088 A1 | 12/2003 | Liu | |
| 2004/0208579 A1 * | 10/2004 | Bendett et al. | 398/84 |
| 2004/0208586 A1 | 10/2004 | Kinoshita | |
| 2005/0123246 A1 * | 6/2005 | Morse et al. | 385/53 |
| 2005/0152648 A1 * | 7/2005 | Madsen et al. | 385/49 |
| 2005/0219682 A1 * | 10/2005 | Natori et al. | 359/337 |
| 2006/0029323 A1 | 2/2006 | Nikonov et al. | |
| 2008/0192333 A1 * | 8/2008 | Bolshtyansky et al. | 359/334 |
| 2008/0193136 A1 * | 8/2008 | Masuda et al. | 398/92 |
| 2009/0026745 A1 | 1/2009 | Dumont et al. | |
| 2009/0180734 A1 * | 7/2009 | Fiorentino et al. | 385/31 |
| 2009/0231684 A1 | 9/2009 | Gonthier et al. | |
| 2010/0178007 A1 * | 7/2010 | Thomson et al. | 385/55 |
| 2011/0274438 A1 * | 11/2011 | Fiorentino et al. | 398/141 |
| 2012/0155805 A1 * | 6/2012 | Doerr | 385/37 |
| 2012/0155806 A1 * | 6/2012 | Doerr et al. | 385/37 |
| 2012/0170933 A1 * | 7/2012 | Doerr et al. | 398/48 |
| 2012/0195600 A1 * | 8/2012 | Winzer | 398/143 |
| 2013/0051729 A1 * | 2/2013 | Chen et al. | 385/32 |
| 2013/0216184 A1 * | 8/2013 | Kopp et al. | 385/43 |

FOREIGN PATENT DOCUMENTS

| | | |
|---|---|---|
| JP | H01257921 A | 10/1989 |
| WO | 2004040810 A1 | 5/2004 |
| WO | 2010080157 A1 | 7/2010 |

OTHER PUBLICATIONS

Foreign Communication From a Related Counterpart Application, Chinese Application No. 201180061426.2, Partial Translation of Chinese Office Action dated Aug. 7, 2014, 4 pages.

Palen, E., "Optical Coupling to Monolithic Integrated Photonic Circuits," 2007 Proceedings of the International Society for Optical Engineering, 2007, vol. 6478, pp. 64780K-1-64780K-6.

Thomson, R., et al., "Ultrafast Laser Inscription of a High-Gain Er-Doped Bismuthate Glass Waveguide Amplifier," Optics Express, vol. 18, No. 12, Jun. 7, 2010, pp. 13212-13219.

Foreign Communication From a Related Counterpart Application, Korean Application No. 2013-7016862, Korean Office Action dated Jun. 25, 2014, 6 pages.

Foreign Communication From a Related Counterpart Application, Korean Application No. 2013-7016862, Partial Translation of the Korean Office Action dated Jun. 25, 2014, 6 pages.

Zhu, B., et al., "Seven-core Multicore Fiber Transmissions for Passive Optical Network," Opt. Express 18, 11117-11122 (2010).

Thomson, R.R., et al., "Ultrafast Laser Inscription of a Three Dimensional Fan-out Device for Multicore Fiber Coupling Applications," CLEO 2008, JWA62.

Thomson, R.R., et al., "Ultrafast-Laser Inscription of a Three Dimensional Fan-out Device for Multicore Fiber Coupling Applications," Optics Express, vol. 15, Issue 18, pp. 11691-11697 (2007).

Wang, Zhechao, et al., "Experimental Demonstration of a High Efficiency Polarization Splitter Based on a One-Dimensional Grating with a Bragg Reflector Underneath", IEEE Photonics Technology Letters, vol. 22, No. 21, Nov. 1, 2010, pp. 1568-1570.

Wang, Zhechao, et al., "Experimental Demonstration of an Ultracompact Polarization Beam Splitter Based on a Bidirectional Grating Coupler", 2009 OSA/ACP 2009, 2 pages.

Maier, Guido, et al., "Optical-Switch Benes Architecture Based on 2-D MEMS", 2006 IEEE, 6 pages.

Tang, Yongbo, et al., "Proposal for a Grating Waveguide Serving as Both a Polarization Splitter and an Efficient Coupler for Silicon-on-Insulator Nanophotonic Circuits"; IEEE Photonics Technology Letters, vol. 21, No. 4, Feb. 15, 2009, pp. 242-244.

Taillaert, Dirk, et al., "A Compact Two-Dimensional Grating Coupler Used as a Polarization Splitter", IEEE Photonics Technology Letters, vol. 15, No. 9 Sep. 2003, pp. 1249-1251.

Doerr, Christopher R., et al., "Monolithic Polarization and Phase Diversity Coherent Receiver in Silicon"; Journal of Lightwave Technology, 2010 IEEE, pp. 520-525.

OCC—Optical Cable Corporation, Fiber Optic Cable Indoor/outdoor & Premises, 2010, 27 pages.

Foreign Communication From a Related Counterpart Application, Japanese Application No. 2013-547585, Japanese Office Action dated Jul. 31, 2014, 6 pages.

Foreign Communication From a Related Counterpart Application, Korean Application No. 2013-7016862, Notice of Final Rejection dated Jan. 28, 2014, 6 pages.

\* cited by examiner

US 9,103,987 B2

OPTICAL AMPLIFIER FOR MULTI-CORE OPTICAL FIBER

CROSS-REFERENCE TO RELATED APPLICATIONS

This application is a continuation of U.S. patent application Ser. No. 13/012,730, issued as U.S. Pat. No. 8,548,291, entitled "OPTICAL AMPLIFIER FOR MULTI-CORE OPTICAL FIBER", filed on Jan. 24, 2011, to Christopher Doerr, et al, and is commonly assigned with the present invention and is incorporated herein by reference as if reproduced herein in its entirety. This application claims the benefit of provisional patent application Ser. No. 61/428,154 to Doerr, et al., filed on Dec. 29, 2010, incorporated herein by reference. This application is related to application Ser. No. 13/012,712, entitled "CORE-SELECTIVE OPTICAL SWITCHES" by Doerr, et al., filed on Jan. 24, 2011, and incorporated herein by reference in its entirety.

TECHNICAL FIELD

This application is directed, in general, to an optical amplifier and methods of making and using such devices.

BACKGROUND

Optical multi-core fibers include several core regions, wherein each core region is capable of propagating substantially independent optical signals. Such fibers may provide significantly greater data capacity than a single core fiber. Thus, multi-core fibers enable significant increases to the rate of data transfer in optical systems for lower cost than would be the case for one or multiple single-mode fibers.

SUMMARY

One aspect provides an optical device. The optical device comprises a first optical coupler located over a surface of a substrate such that the optical coupler is able to end-couple to an optical core of a first optical fiber having an end facing and adjacent to the first optical coupler and the surface. The optical device further comprises a second optical coupler located over the surface such that the second optical coupler is able to end-couple to an optical core having an end facing and adjacent to the second optical coupler. The optical device also comprises a pump coupler being configured to couple pump light to an optical path that connects the first optical coupler and the second optical coupler.

Another aspect provides a method. The method comprises forming a first optical coupler located over a surface of a substrate such that the optical coupler is able to end-couple to an optical core of a first optical fiber having an end facing and adjacent to the first optical coupler and the surface. The method also comprises forming a second optical coupler located over the surface such that the second optical coupler is able to end-couple to an optical core having an ends facing and adjacent to the second optical coupler. The method further comprises forming a pump coupler located over the surface, the pump coupler configured to couple pump light to an optical path that connects the first optical coupler and the second optical coupler.

BRIEF DESCRIPTION

Reference is made to the following descriptions taken in conjunction with the accompanying drawings, in which.

DETAILED DESCRIPTION

Herein, optical components may be, e.g., formed over a surface of a substrate using layer deposition, layer doping, and patterning processes that are conventionally used in the micro-electronics and/or integrated optics fields.

Figure 1:
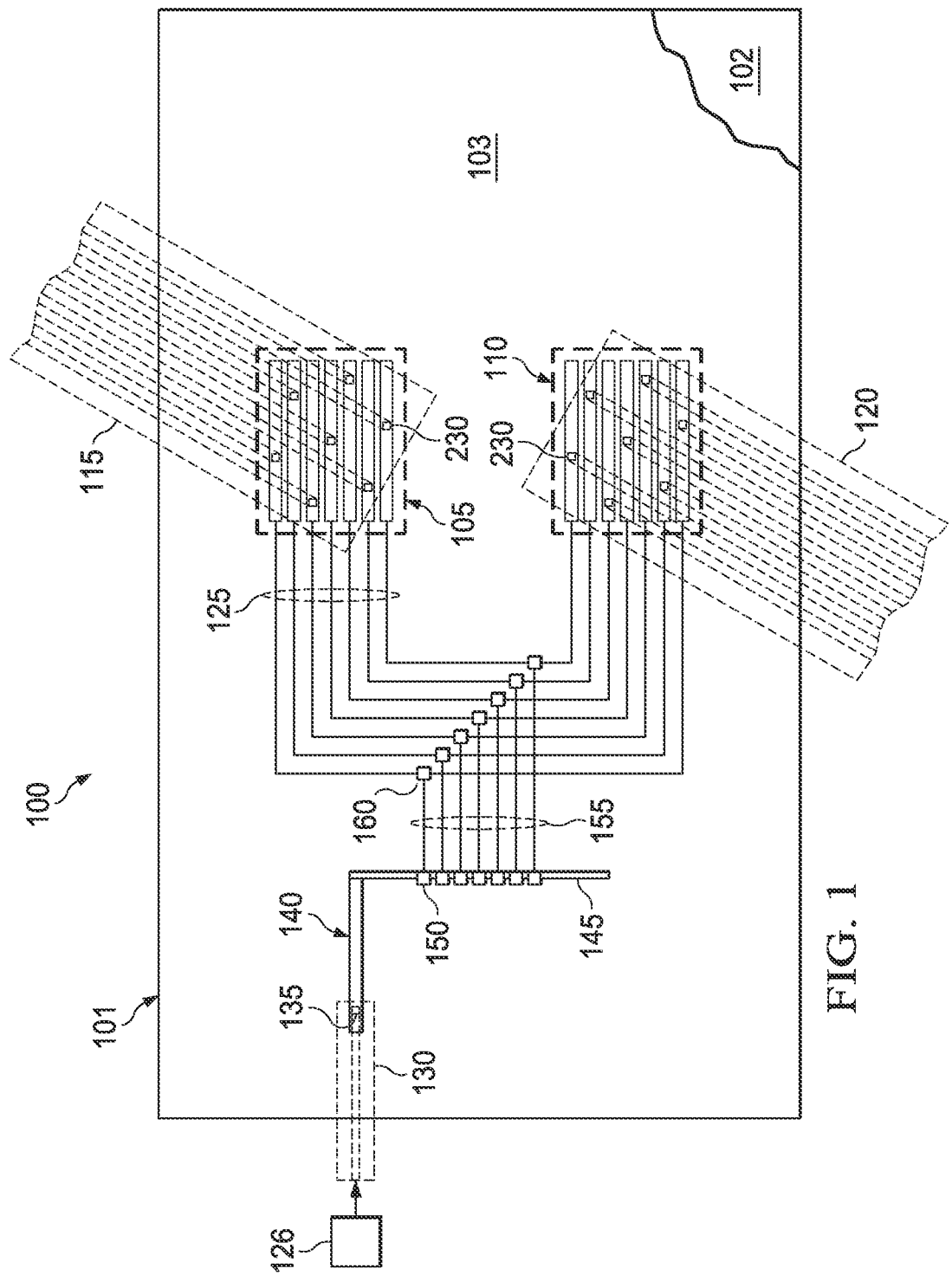
FIG. 1 illustrates an embodiment of an optical amplifier for a multi-core optical amplifier.

FIG. 1 illustrates an example of an optical amplifier 100 for a multi-core optical fiber. The optical amplifier 100 includes an integrated planar photonic device (IPD) 101 and a laser pump source 126.

The IPD 101 includes first and second integrated planar arrays 105, 110 of optical couplers 230 and optical waveguides 125 over a planar surface of a substrate 102. The optical waveguides 125 connect the optical couplers 230 of the first and second integrated planar arrays 105, 110 in a one-to-one manner. The optical couplers 230 of the first integrated planar array 105 optically end-couple to corresponding optical cores of a first multi-core fiber (MCF) 115, e.g., the output MCF. The optical couplers 230 of the second integrated planar array 110 optically end-couple to corresponding optical cores of a second MCF 120, e.g., the input MCF. But, in some embodiments, one or more optical cores of the MCFs 115, 120 may not couple to the IPD 100. The substrate 102 may optionally include an optical isolation layer 103, e.g. a dielectric layer, to optically isolate the substrate 102 from optical components formed thereover.

The laser pump source 126 transmits pump light to the optical waveguides 125 to amplify light transmitted between the first and second MCFs 115, 120 via the IPD.

The device 100 may selectively amplify light received from the different optical cores of the MCF 120 as described further below.

Figure 2:
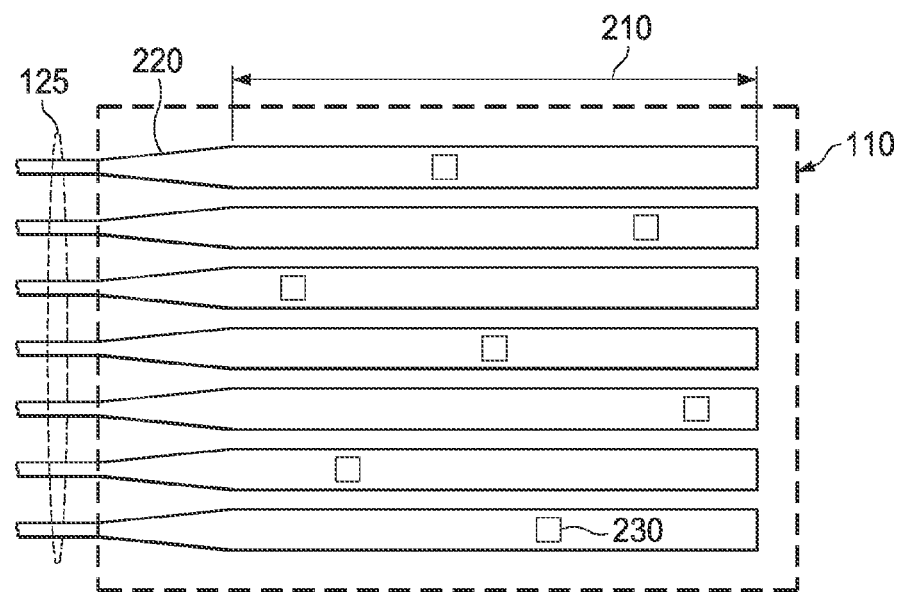
FIG. 2 illustrates an example of an integrated planar array of optical couplers that may be used in the optical amplifier of FIG. 1.

FIG. 2 illustrates a single array of optical couplers, e.g. the integrated planar array 105 or the integrated planar array 110. The illustrated array includes segments of the seven optical waveguides 125. In the array, each optical waveguide segment includes, e.g., an optical coupling segment 210 and a transition segment 220. Each optical coupling segment 210 has an optical coupler 230 located thereon or therein. The optical coupler 230 is laterally positioned to optically end-couple a single corresponding optical core of a MCF (not shown). The optical coupling segments 210 may be customized to enhance their couplings to the corresponding optical cores of an MCF via corresponding transition segment 220, e.g., each optical coupling segment 210 may be wider than the remainder of the same optical waveguide. Each transition segment 220 provides a coupler between the optical coupling segment 210 and a communication segment of the same optical waveguide (shown to the left in FIG. 2). The transition segment 220 may be configured to reduce coupling/insertion losses between the differently sized coupling and communication segments of the optical waveguides.

Examples of some grating couplers that may be suitable for use as the optical couplers 230 may be described, e.g., in U.S. patent application Ser. No. 12/972,667 (the '667 Application) titled "Multi-Core Optical Cable to Photonic Circuit Coupler" to Christopher Doerr, incorporated herein by reference in its entirety. In some embodiments the optical couplers may include the use of a 45° mirror configured to redirect the light from one or more of the waveguides 125 into a core of one of the MCFs 115, 120.

The optical couplers 230 are often arranged in a lateral pattern that corresponds in form and size to a lateral pattern of optical cores within an MCF to be coupled, e.g., as discussed in the '667 application. In the illustrated embodiment, the example array of FIG. 2 is configured to couple to seven optical cores located at the corners and center of a regular hexagon. However, embodiments are not limited to such an arrangement of optical cores in a MCF or to a particular number of cores in the MCF.

Figure 3:
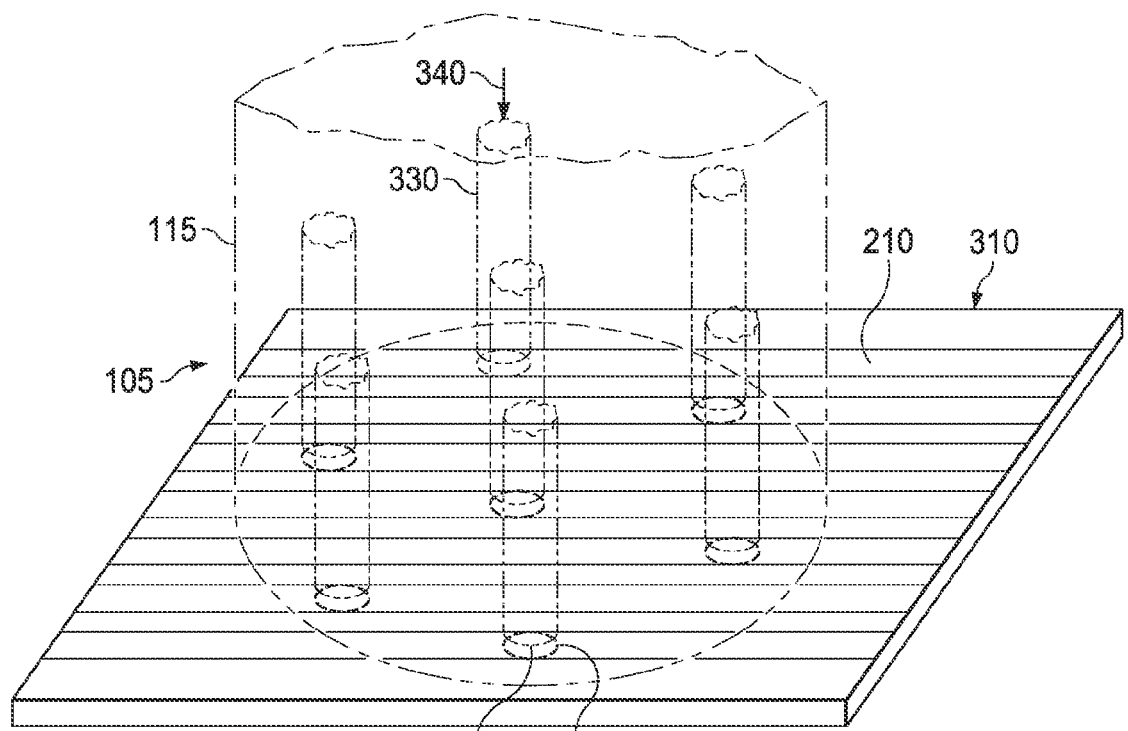
FIG. 3 illustrates the spatial relationship between a multi-core optical fiber (MCF) and the array of optical couplers of FIG. 2.

FIG. 3 illustrates a perspective view of an embodiment of the integrated planar array 105, i.e., an array of seven optical couplers 230, for the case of the MCF 115 being coupled to the integrated planar array 105 which is located over a planar substrate 310. The MCF 115 is illustrated having seven optical cores 330 with one optical core 330 propagating an optical signal 340. An end of the MCF 115 is located over and is rotationally aligned so that the individual optical cores of the MCF 115 face and optically couple to corresponding individual ones of the optical couplers 230 of the integrated planar array 105. For example, each optical core 330 may have an end 350 positioned and oriented to project a light spot 360 onto the corresponding optical coupler 230 of the integrated planar array 105 without projecting light onto other optical couplers thereof. Additional examples of ways to construct and configure the integrated planar arrays 105, 110 with respect to MCFs such as the MCFs 115, 120 may be described in the '667 Application.

Figure 4A:
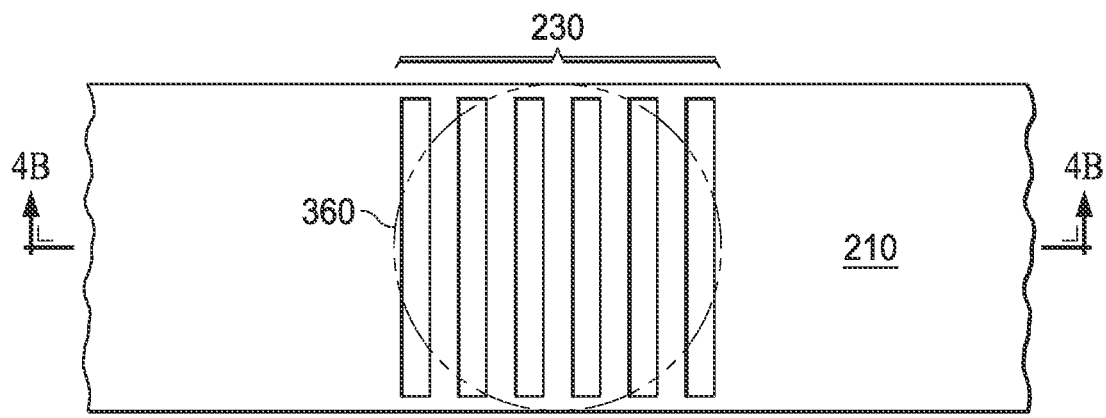
FIGS. 4A and 4B illustrate exemplary spatial relations between a single core of an MCF and an example of one of the optical couplers of FIG. 3.
Figure 4B:
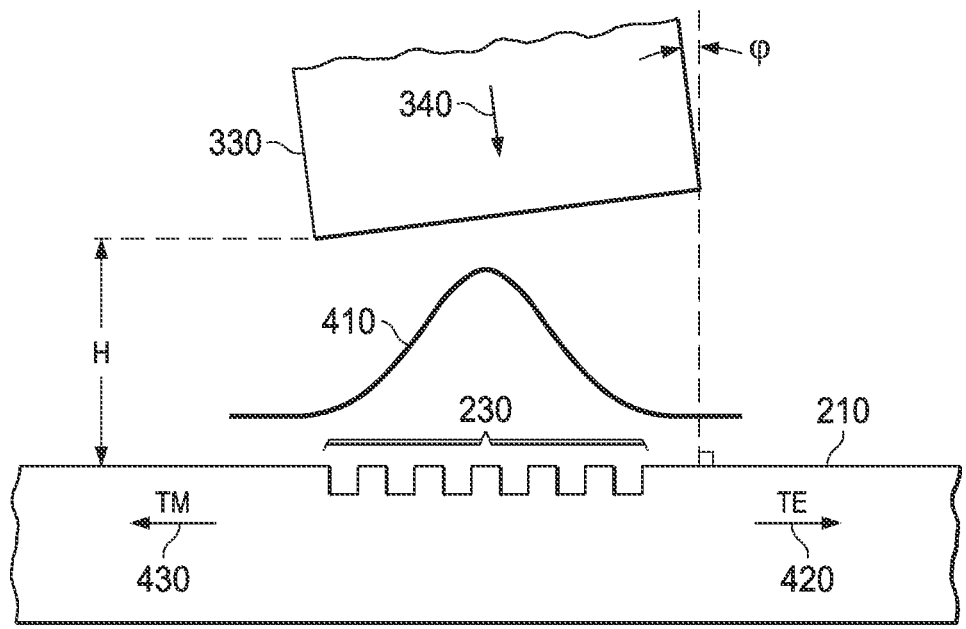

FIGS. 4A and 4B illustrate orientational and locational aspects of the coupling of one of the optical cores 330 of the MCF 115 of FIG. 3 to the corresponding optical coupler 230 in the integrated planar array 110, e.g. a 1-D array of gratings. The projected light spot 360 produces an approximate Gaussian distribution 410 located over the optical coupler 230 with sufficient overlap to couple light from the optical signal 340 to the optical coupling segment 210.

In the illustrated embodiment, the optical core 330 makes an angle φ with respect the surface normal of the optical coupling segment 210 to produce a polarization-separating optical coupler. In particular, at the particular angle φ determined in part by the wavelength of the optical signal 340 a TE polarization mode 420 of the optical signal 340 couples to the optical coupling segment 210 with a propagation direction to the right as FIG. 4B is oriented. Similarly, a TM polarization mode 430 of the optical signal 340 couples to the optical coupling segment 210 with a propagation direction to the left as FIG. 4B is oriented. Such coupling of TE and TM polarization modes may form a polarization-diverse embodiment of an optical amplifier for an MCF, as described further below. Additional information regarding such polarization splitting may be found in Yongbo Tang, et al., "Proposal for a Grating Waveguide Serving as Both a Polarization Splitter and an Efficient Coupler for Silicon-on-Insulator Nanophotonic Circuits", IEEE Photonics Technology Letters, Vol. 21, No. 4, pp 242-44, Feb. 15, 2009, incorporated herein by reference in its entirety.

Figure 5:
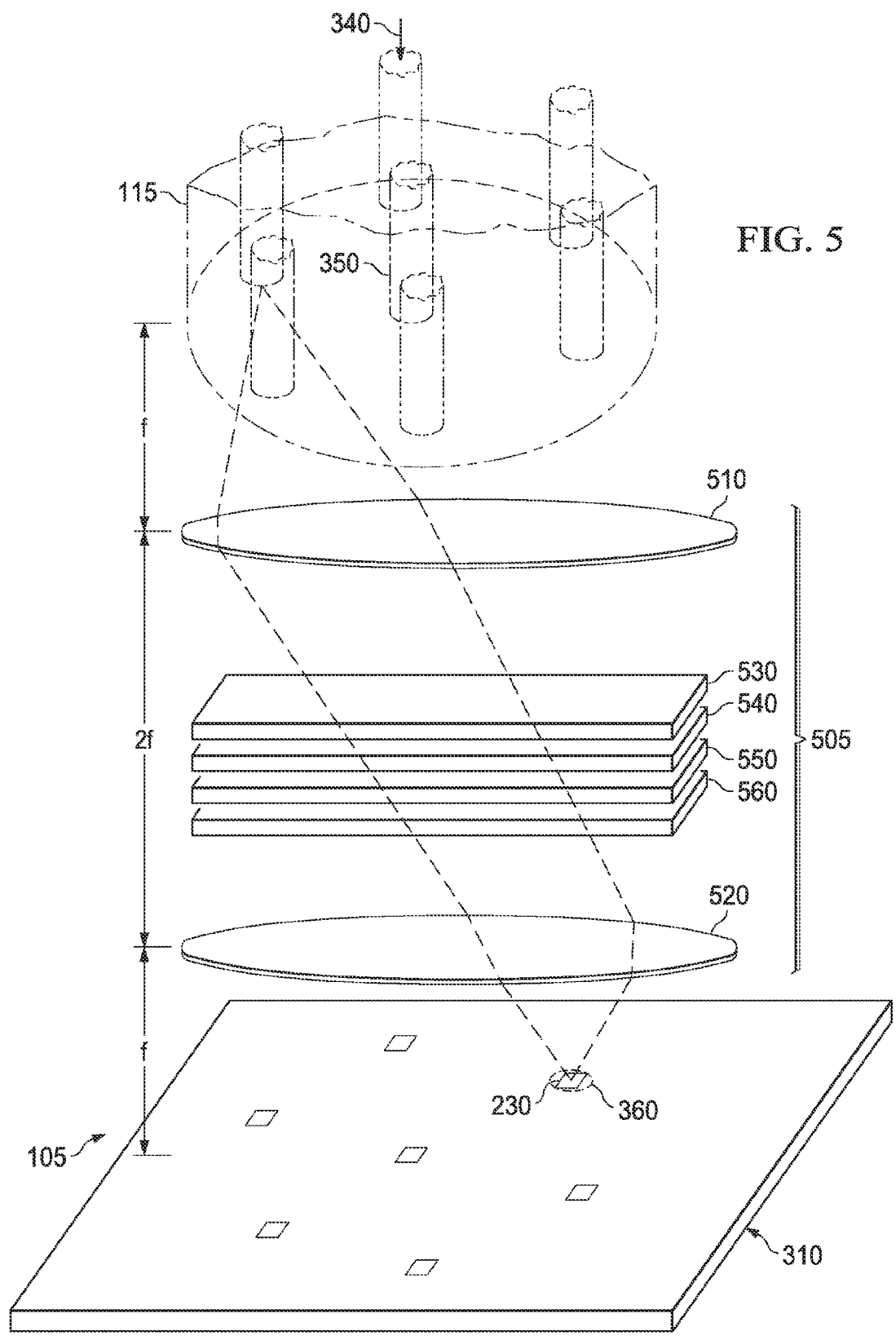
FIG. 5 illustrates an embodiment of an array of optical couplers of FIG. 3 that includes isolation optics located between an MCF and the per-core optical couplers of the array of optical couplers of FIG. 2.

FIG. 5 illustrates an isolation assembly 505 that may optionally be placed between the MCF 115 and the integrated planar array 105 and/or between the MCF 120 and the integrated planar array 110. The isolation assembly 505 attenuates back reflected light produced between the MCF 115 and the integrated planar array 105. FIG. 5 presents the illustrative case of the MCF 115 optically coupled to the integrated planar array 105.

The isolation assembly includes lenses 510, 520 each having a focal length f. Between the lenses 510, 520 are located a beam displacer 530, a Faraday rotator 540, a quarter-wave plate 550 and a beam displacer 560. The lens 510 is spaced at a distance of about f from, e.g. the end 350 to collimate light beams from the optical cores of the MCF. The lens 520 is spaced at a distance of about f from, e.g. the integrated planar array 105, e.g., to focus collimated light beams from the optical cores of the MCF 115 onto the optical couplers. The lenses 510, 520 are, e.g., spaced at a distance of about 2f from each other. The isolator assembly directs light from the end 350, e.g. the optical signal 340, to the indicated corresponding optical coupler 230. Light from the other cores of the MCF 115 are similarly directed to the other corresponding optical couplers 230 of the integrated planar array 105.

Returning to FIG. 1, the laser pump source 126 produces pump light at a wavelength suitable for Raman amplification or at a wavelength suitable for amplification via excitation of rare-earth dopants. In the former case, the wavelength of the pump light produces forward or backward Raman amplification in the MCF 115 or the MCF 120. In the later case, the wavelength of the pump light excites rare-earth dopants in the optical cores of one of the MCFs 115, 120 or in the optical waveguides 125 thereby causing optical amplification therein. In embodiments where rare-earth dopants are erbium atoms, a pump wavelength suitable to excite erbium atoms may be, e.g., a wavelength of about 1480 nm.

The laser pump source 126 may transmit the pump light to an optical bus network 145 that transmits pump light to the individual optical waveguides 125 via programmable or adjustable optical taps 150.

In some embodiments, the laser pump source 126 is external, and an optical waveguide 130, e.g., an SCF, an optical coupler 135, e.g. a 1-D array of gratings, and a waveguide 140 connect the laser pump source 126 to the optical bus network 145.

In other embodiments (not shown), the laser pump source 126 may be integrated over the substrate 102, and a planar waveguide over the substrate 102 may connect the laser pump source 126 to the waveguide 140.

Each programmable optical tap 150 may transmit pump light from the optical bus network 145 to the corresponding one of the optical waveguides 125 via a waveguide 155 and a pump coupler 160. Each pump coupler 160 may include, e.g., a Mach-Zehnder Interferometer (MZI) configured as a 2×1 optical coupler to combine pump light with light from one of the integrated planar arrays 105, 110 such that the combined light is directed to the other of the integrated planar arrays 110, 105.

Figure 6:
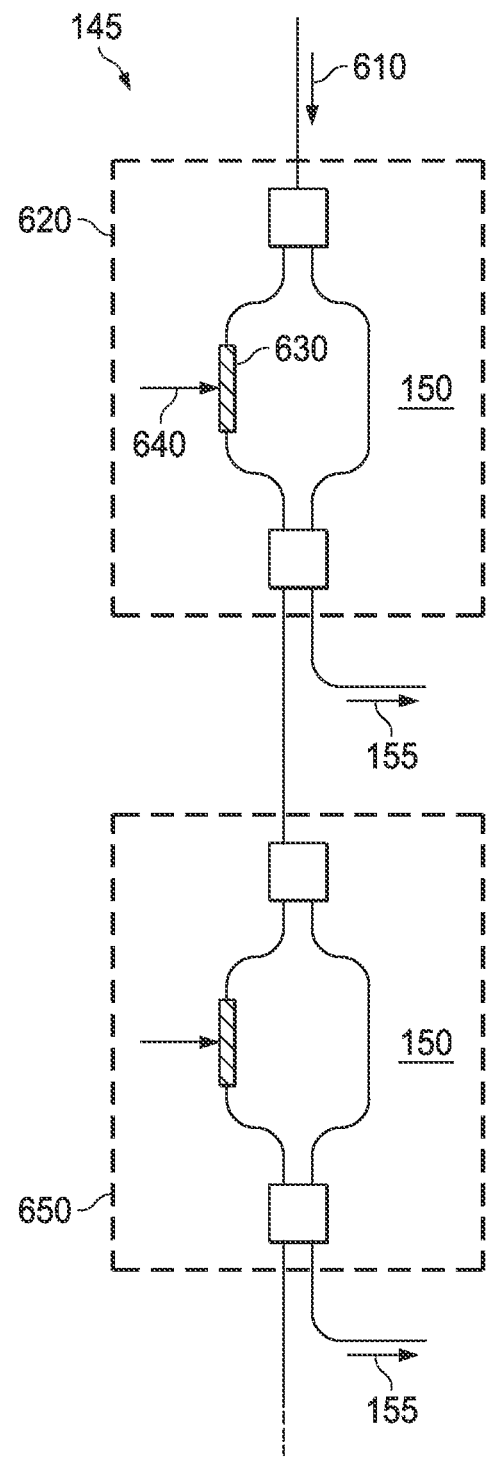
FIG. 6 illustrates an embodiment of optical taps, e.g. a bus network, that may be used with the optical amplifier of FIG. 1 to provide pump light to optical paths therein.

FIG. 6 illustrates an example of the optical bus network 145 of FIG. 1 in which variable Mach-Zehnder interferometers (MZIs) 620, 650 function as the programmable optical taps 150. The optical bus network 145 receives pump light 610, e.g., from the laser pump source 126. The first variable MZI 620 transmits a portion of the received pump light 610 to a first of the waveguides 155 and transmits about the remainder of the received pump light 610 to the second variable MZI 650. The first variable MZI 620 includes a phase shifter 630, e.g. a heater-controlled thermally-sensitive waveguide segment. The phase shifter 630 may be controlled by a tap control signal 640 to direct a selectable portion of the received pump light 610 to the first of the waveguides 155. The second variable MZI 650, and any later variable MZI instances of one of the programmable optical taps 150, may operated in a manner similar to that described for the first variable MZI 620 with appropriate adjustment of associated tap control signals to account for the reduction of pump light intensity as portions thereof are tapped off.

The programmable optical taps 150 may be separately adjustable to vary the amount of pump light coupled from the optical bus network 145 to the various individual optical waveguides 125. Thus, the degree of optical amplification of light from each optical core of the input one of the MCFs 115, 120 may be separately adjusted to provide a desired amplification thereof.

In some embodiments the optical bus network 145 is replaced by a tree network. For example, 1×2 adjustable couplers may be configured in a tree configuration to divide the power from the laser pump laser 126 to a desired number of optical waveguides 125.

In some embodiments, additional pump lasers (not shown) may be used to pump the MCF 115 and/or the MCF 120. Each pump laser may be connected to one or more programmable taps (not shown) that connect to one or more of the MCF 115, 120 optical cores. In one embodiment, the amplifier 100 includes a pump laser corresponding to each optical core of the MCF 115 and/or the MCF 120. In such embodiments the programmable optical taps 150 are not necessary. In another embodiment, the optical paths that connect each of multiple pump lasers to the optical waveguides 125 may be interconnected to provide redundant pumping capability. For example, if one pump laser fails, another pump laser can be switched in to power the cores of the MCF 115 and/or the MCF 120 associated with the failed pump laser.

Figure 7:
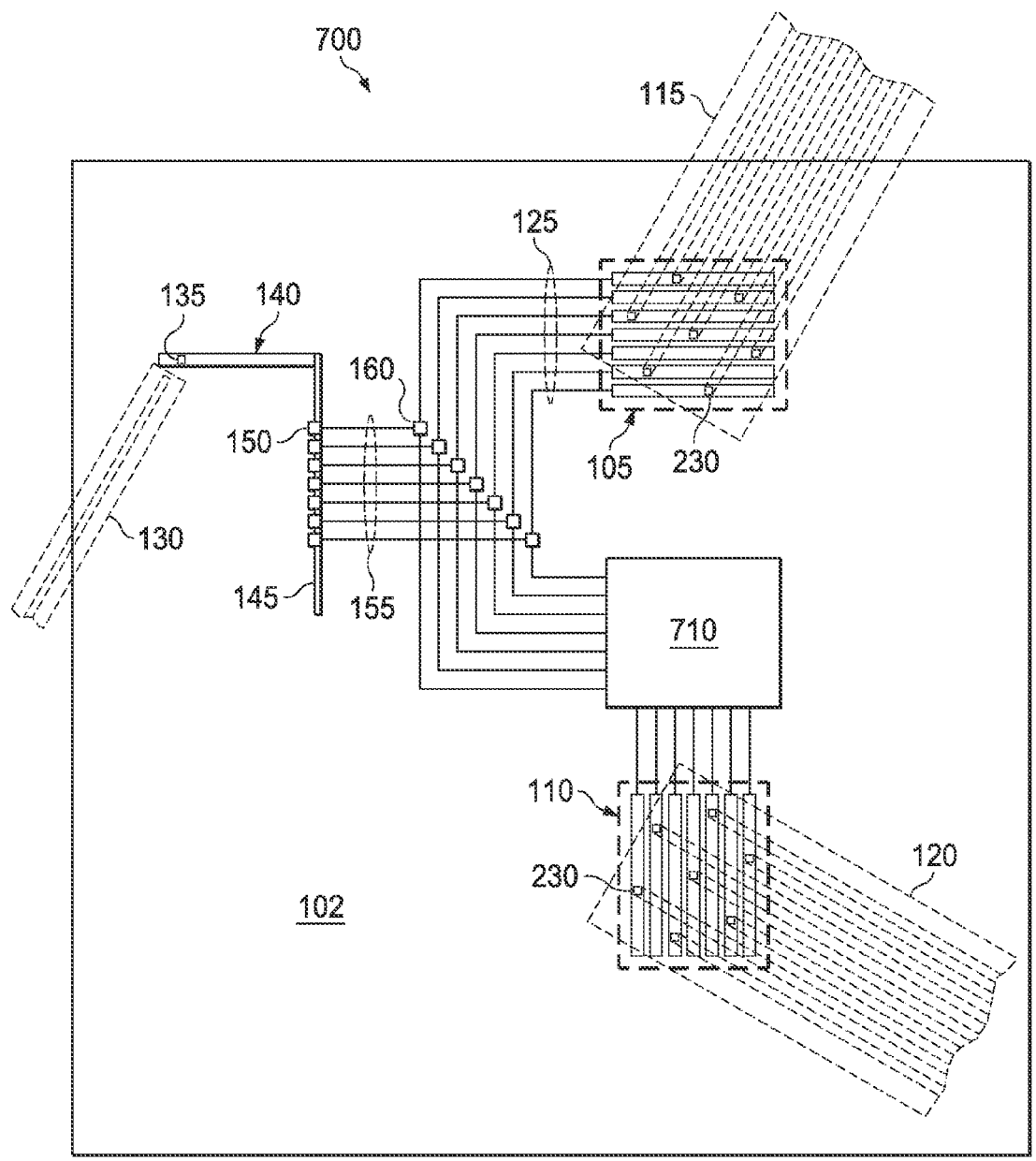
FIG. 7 illustrates an embodiment of an optical amplifier for a MCF that includes an optical switching network between the input and output MCFs.

FIG. 7 illustrates an embodiment of an optical core switcher 700 that includes a switch network 710 between the integrated planar array 105 and the integrated planar array 110. Examples of switch networks that may be suitable for the switch network 710 are described in the '969 Application. The switch network 710 is able to couple each optical coupler 230 of the integrated planar array 105 to any selected one of the optical couplers 230 of the integrated planar array 110. In particular, the switch network connects the optical couplers 230 of the two integrated planar arrays 105, 110 in a one-to-one manner. Thus, the optical core switcher 700 can permute the assignments of optical signal streams to particular optical cores in transferring the signal streams between the MCF 115 and the MCF 120. During this permutation of assignments of optical cores, the optical core switcher 700 may also differently amplify the optical signal streams on individual optical cores as desired. Such switching of the assignments of optical cores may be beneficial in various optical signal processing applications.

Figure 8:
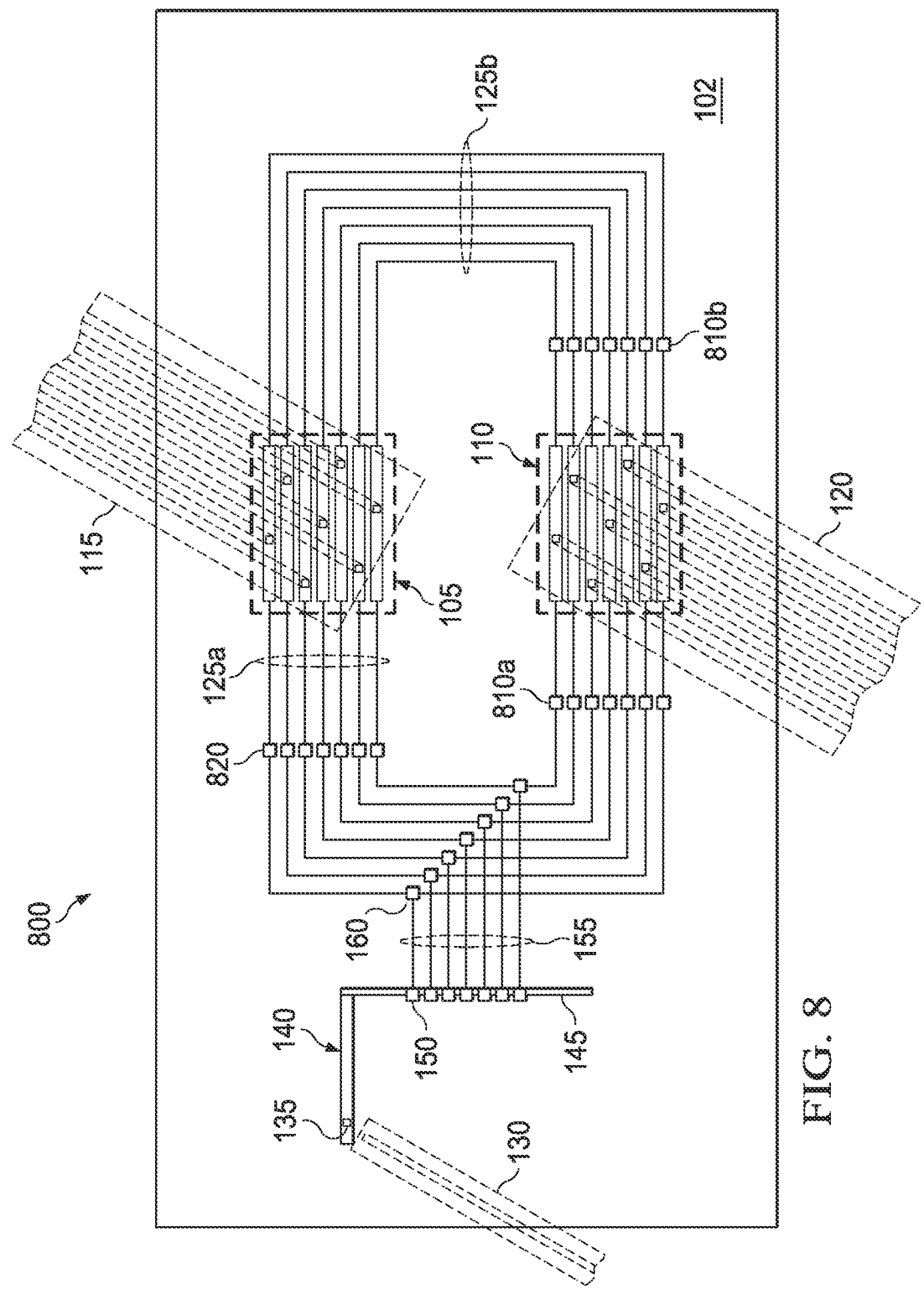
FIG. 8 illustrates an embodiment of an optical amplifier for a MCF that is configured to provide polarization diverse amplification.

FIG. 8 illustrates an embodiment of an optical amplifier 800 for MCFs in which optical waveguides 125a, 125b provide parallel optical paths between the integrated planar array 105 and the integrated planar array 110. Herein, light coupled from a core of the MCF 115 is separated into TE and TM polarization modes by the special construction of the optical couplers 230 of the integrated planar array 105. For example, the optical couplers 230 of the integrated planar array 105 may have the construction illustrated in FIG. 4B. The optical couplers 230 of the integrated planar array 105 couple the TE mode light into the optical waveguides 125b and couple the TM mode light into the optical waveguides 125a. The light propagating on a pair of optical waveguides 125a, 125b that couple to the same optical coupler 230 of the second array 110, may be coupled by the respective optical waveguides 125a, 125b to the same or different optical couplers 230 of the first integrated planar array 115. In this manner both polarization modes of a received polarization-diverse optical signal may be amplified within an optical core of the MCF 115, thereby realizing polarization-diverse optical amplification of the received signal.

In some embodiments, the optical amplifier 800 includes optional variable optical attenuators (VOAs) 810a, 810b. The VOAs 810a, 810b may be independently controlled to attenuate any of the TE signal components and/or any of the TM components of signals amplified by the optical amplifier 800. Thus, the relative intensity of polarization modes of an optical signal may be altered, e.g. to account for polarization-dependent attenuation within the optical amplifier 800 itself or elsewhere.

Some embodiments include one or more photodetectors 820, e.g. photodiodes, configured to monitor the optical power in the optical cores of each optical waveguide 125. The photodetectors may thereby indirectly monitor the optical power in one or more of the optical cores of the MCF 115, 120. Such monitoring may be used to, e.g. provide feedback for controlling the programmable optical taps 150 to deliver a desired pump power to the optical waveguide 125 and/or optical cores of the MCFs 115, 120.

Figure 9:
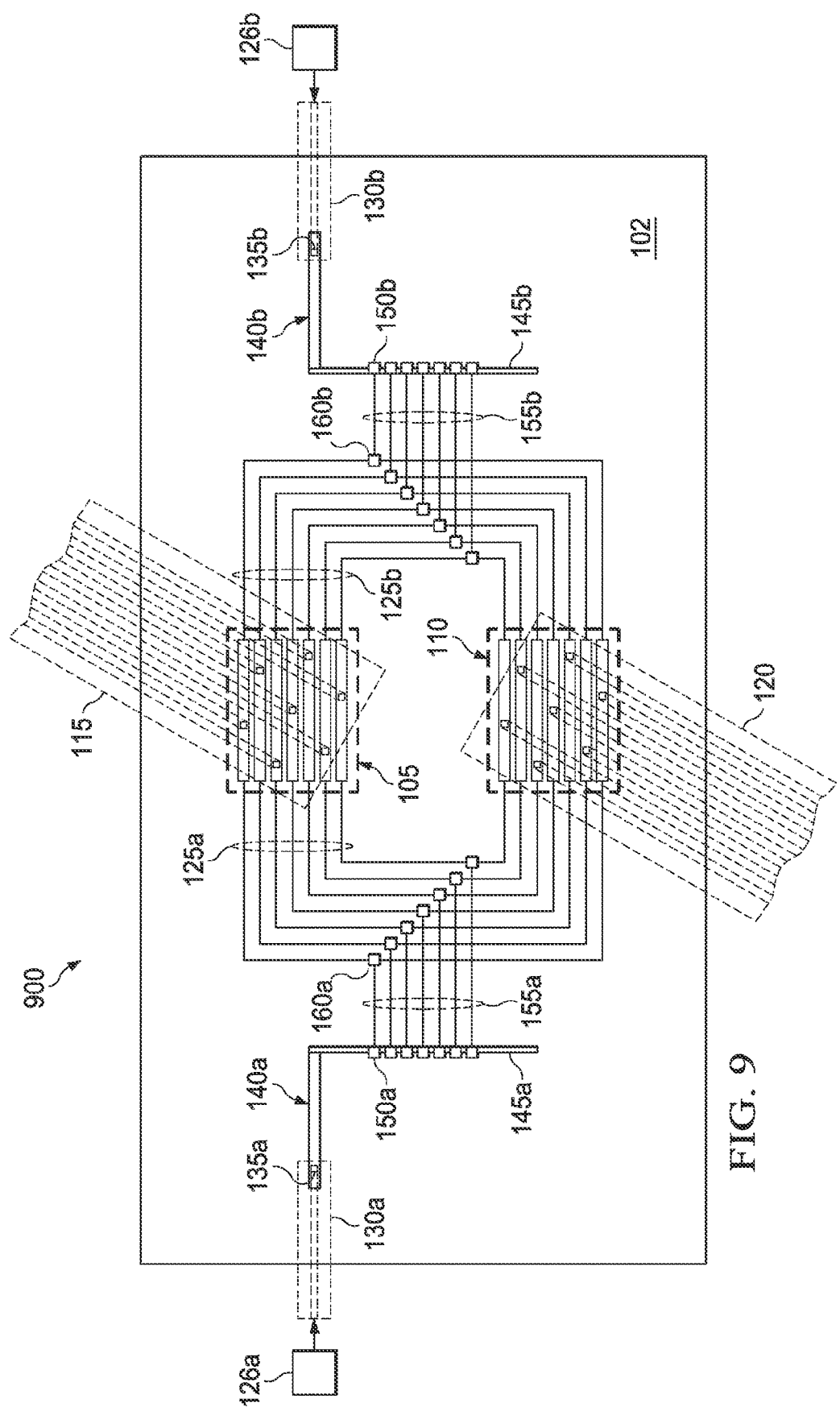
FIG. 9 illustrates an embodiment of an amplifier for MCF includes two pump light sources.

FIG. 9 illustrates an embodiment of an amplifier 900. The optical amplifier 900 includes a second laser pump source 126b for the optical waveguides 125b. The second laser pump source 126b may connect to the optical waveguides 125b via a SCF 130b, an optical coupler 135b, a waveguide 140b and an optical bus network 145b. The pump light is distributed to the optical waveguides 125b from the optical bus network 145b via programmable optical taps 150b and waveguides 155b. The operation of the distribution components for the pump light from the laser pump source 126b is similar to the operation of the distribution components as described previously with respect to FIG. 1B. Inclusion of the second laser pump source 126b may be beneficial, e.g., to increase the total pump light power available to amplify the output optical signal(s) in some special embodiments of the optical amplifier 900.

Figure 10:
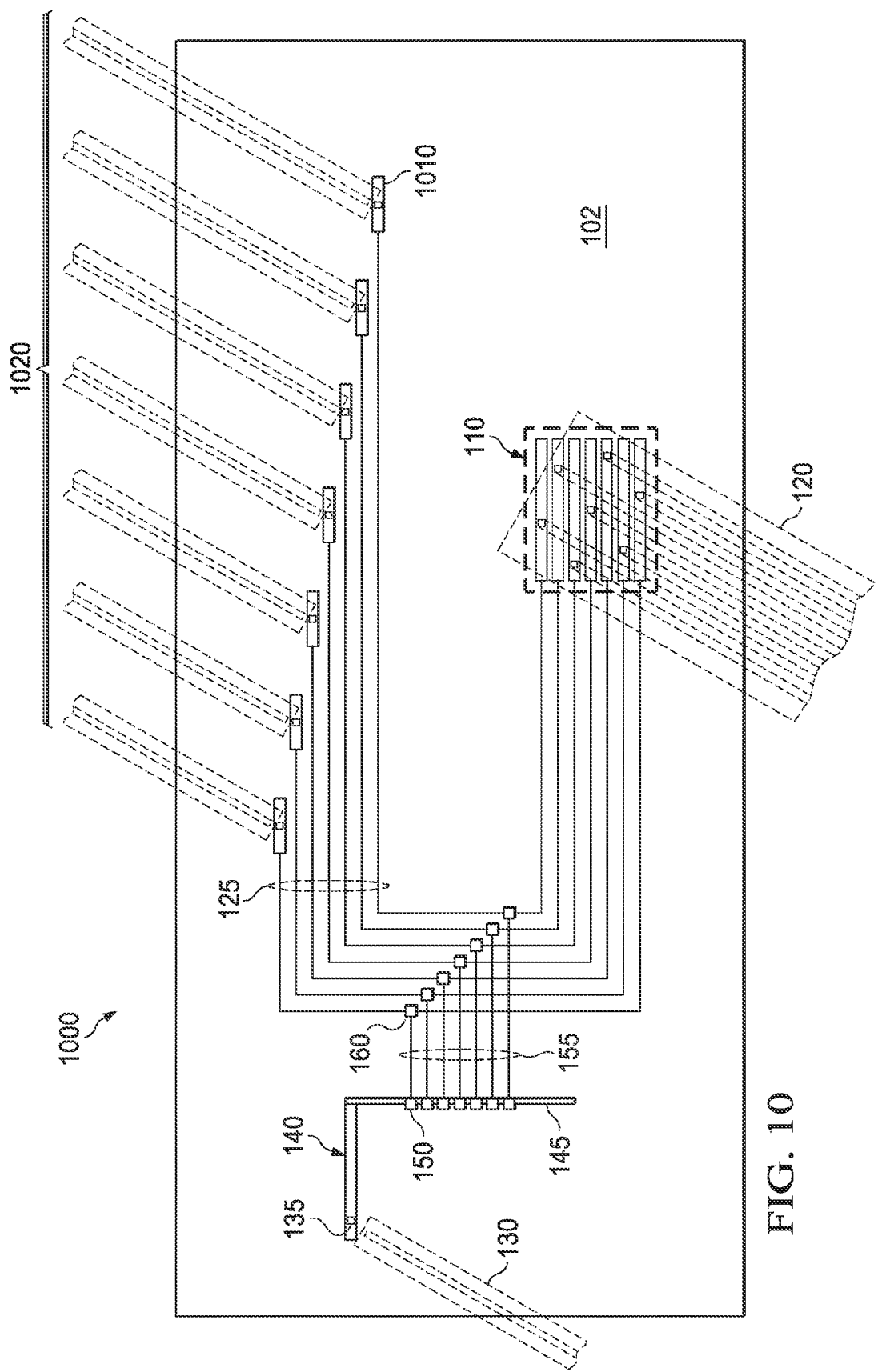
FIG. 10 illustrates an embodiment of an optical device for end-coupling single-core fibers to separate optical cores of a MCF and for optically amplifying light therein.

FIG. 10 illustrates an optical coupler 1000 for the MCF 120 that includes SCF couplers 1010. Each SCF coupler 1010 may include a single optical coupler 230. The SCF couplers 1010 may be spatially separated, e.g. spaced from each other with sufficient distance so that the ends of individual SCFs 1020 may be positioned with respect to the SCF couplers 1010 to couple optical signals thereto. The SCFs 1020 may operate either to provide input optical signals to the optical coupler 1000 or to receive output optical signals therefrom. The optical coupler 1000 may thus provide fan-in or fan-out capability to some of the integrated planar amplifiers described herein.

Figure 11A:
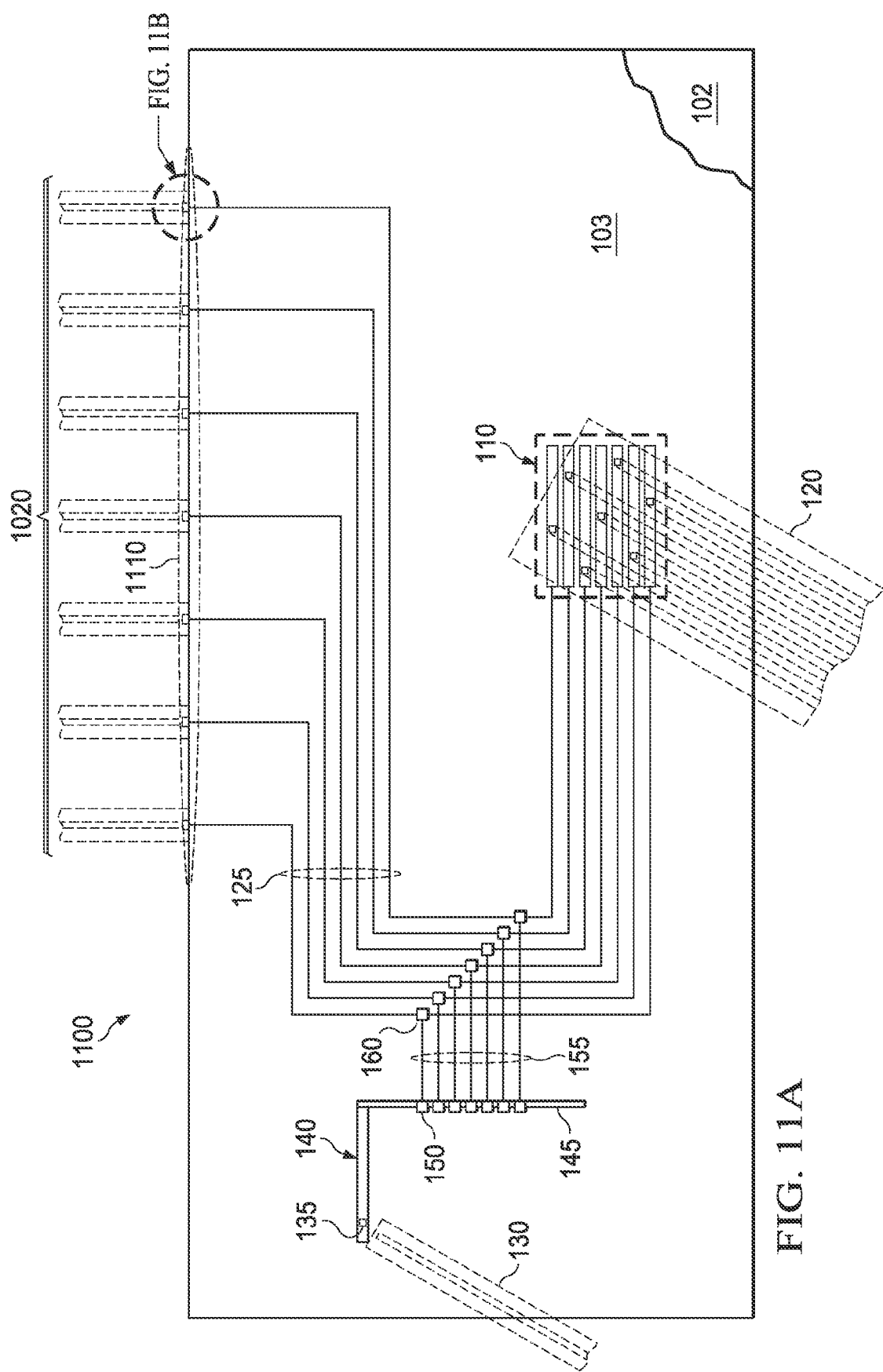
FIG. 11A illustrates an alternate embodiment of the optical device of FIG. 10 in which the single-core fibers optically end-couple to edge-facet couplers.
Figure 11B:
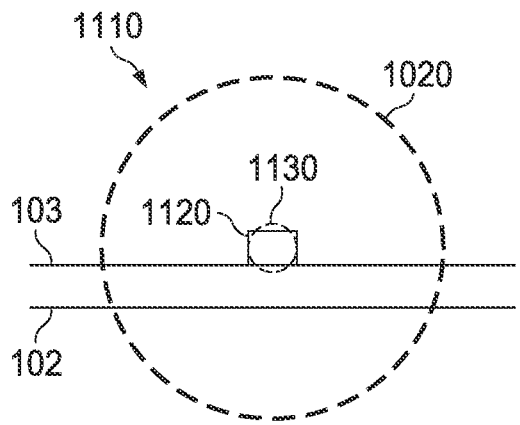
FIG. 11B illustrates a detailed view of the embodiment shown in FIG. 11A.

FIGS. 11A and 11B illustrate an optical coupler 1100 for the MCF 120 that includes SCF couplers, wherein the SCF couplers include edge facet couplers 1110. Each edge facet coupler 1110 includes an edge facet 1120 (FIG. 11B) of one of the optical waveguides 125 extended to an edge of the substrate 102. An optical core 1130 of an SCF 1020 may be aligned with respect to the edge facet 1120, thereby coupling optical signals therebetween. One or more edge facet couplers 1110 may be used with one or more SCF couplers 1010 and/or one or more planar arrays such as the integrated planar array 105 to provide flexible fan-in to and fan-out from the device 100. See U.S. patent application Ser. No. 13/012,693, filed on Jan. 24, 2011 to Doerr, et al. titled, "Multi-Core Optical Cable to Photonic Circuit Coupler", incorporated herein by reference in its entirety, for some examples of edge facet coupling.

Figure 12:
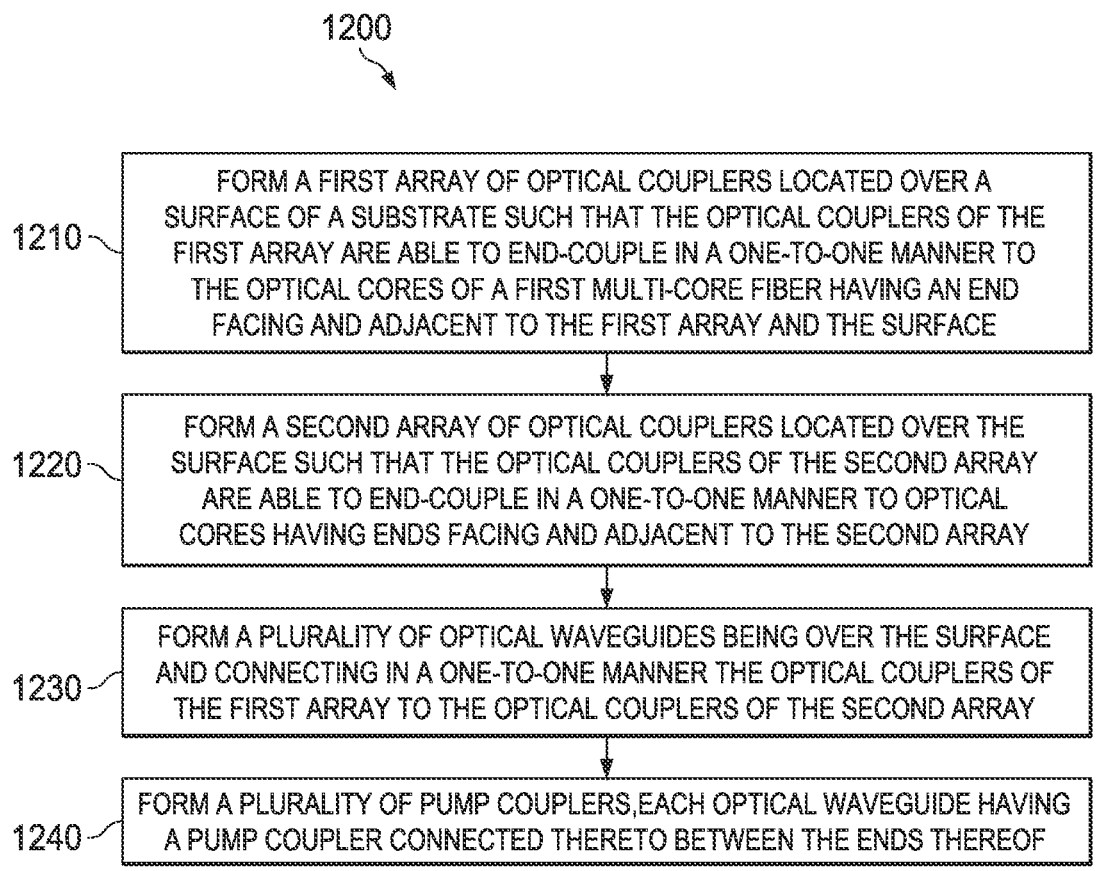
FIG. 12 illustrates a method for forming an optical amplifier for a MCF, e.g., according to FIGS. 1, 7, 8, 9, 10, 11A, or 11B.

Turning to FIG. 12, a method 1200 is presented, e.g. for forming an optical device. The method 1200 is described without limitation by referring to the various embodiments described herein, e.g., embodiments of FIGS. 1-11. The steps of the method 1200 may be performed in an order other than the illustrated order.

In a step 1210, a first array, e.g., the integrated planar array 105, of optical couplers e.g. the optical couplers 230, is formed over a surface of a substrate. The first array is an integrated planar array of optical couplers that are laterally arranged to end-couple to corresponding individual optical cores of a first multi-core fiber, e.g., the MCF 115.

In a step 1220 a second array, e.g., the integrated planar array 110, of optical couplers, e.g., the optical couplers 230, is formed over the same surface of the substrate. The optical couplers of the second array are able to end-couple in a one-to-one manner to optical cores having ends facing and adjacent to the second array. In some embodiments the second array is an integrated planar array of optical couplers that are laterally arranged, such that individual optical couplers end-couple to corresponding individual optical cores of a second multi-core fiber, e.g., the MCF 120.

In a step 1230 a plurality of optical waveguides, e.g. the optical waveguides 125, is formed over the surface. The optical waveguides connect in a one-to-one manner the optical couplers of the first array to the optical couplers of the second array.

In a step 1240 a plurality of pump couplers, e.g. the pump couplers 160, is formed such that each optical waveguide has a pump coupler connected thereto. The pump coupler couples to each optical waveguide between ends of that optical waveguide.

The following provides various optional features of the method 1200. In some cases these optional features may be combined.

Each pump coupler may be adjustable to vary an amount of pump light inserted into the connected optical waveguide. A plurality of variable optical attenuators, e.g. the VOAs 810a, 810b, may be formed wherein each variable optical attenuator is located along one of the optical waveguides. A pump light source, e.g. the laser pump source 126, may be coupled to the pump couplers.

The optical couplers of the second array, e.g. the integrated planar array 110, may be laterally located over a surface to be able to end-couple in a one-to-one manner to the optical cores of a second multi-core fiber, e.g. the MCF 120, having an end facing and adjacent to the first array and the surface. The optical couplers of the second array may be edge facet couplers, e.g. the edge facet couplers 1110. The optical waveguides may be capable of amplifying light therein when optically pumped via the pump couplers. Ends of optical cores of an erbium-doped multi-core fiber may be located proximate the first array of optical couplers such that the optical core are configured to receive pump light from the optical couplers.

A laser pump source may be coupled to the optical pump couplers, wherein the laser pump source has an output wavelength suitable to amplify optical signals in the telecommunications C or L band by Raman amplification. A plurality of second optical waveguides, e.g. the optical waveguides 125b, may be formed over the surface, wherein the second optical waveguides connect in a one-to-one manner the optical couplers of the first array to the optical couplers of the second array.

Those skilled in the art to which this application relates will appreciate that other and further additions, deletions, substitutions and modifications may be made to the described embodiments.

What is claimed is:

1. An optical device, comprising:
    a first optical coupler located over a surface of a substrate such that the optical coupler is able to end-couple to an optical core of a first optical fiber having an end facing and adjacent to the first optical coupler and the surface;
    a second optical coupler located over the surface such that the second optical coupler is able to end-couple to an optical core having an end facing and adjacent to the second optical coupler; and
    a pump coupler being configured to couple pump light to an optical path that connects the first optical coupler and the second optical coupler.

2. The device of claim 1, further including:
    an optical waveguide being over the surface and configured to provide the optical path connecting the first optical coupler to the second optical coupler, wherein the pump coupler is connected to the waveguide between the ends thereof.

3. The device of claim 2, wherein the pump coupler is adjustable to vary an amount of pump light inserted into the connected optical waveguide.

4. The device of claim 2, further including a variable optical attenuator located along the optical waveguide.

5. The device of claim 1, further including an optical photodetector configured to receive a portion of light from a core of the optical fiber.

6. The device of claim 1, further including a pump light source coupled to the pump coupler.

7. The device of claim 1, wherein the second optical coupler is an edge facet coupler.

8. The device of claim 2, wherein the optical waveguide is capable of amplifying light therein when optically pumped via the pump coupler.

9. The device of claim 1, further comprising an erbium-doped optical fiber end-coupled to the first optical coupler, the pump coupler being configured to couple pump light into the erbium-doped optical fiber.

10. The device of claim 1, further including a laser pump source being connected to the pump coupler and having an output wavelength to amplify optical signals in the telecommunications C or L band by Raman amplification.

11. A method, comprising:
forming a first optical coupler located over a surface of a substrate such that the optical coupler is able to end-couple to an optical core of a first optical fiber having an end facing and adjacent to the first optical coupler and the surface;
forming a second optical coupler located over the surface such that the second optical coupler is able to end-couple to an optical core having an ends facing and adjacent to the second optical coupler;
forming a pump coupler located over the surface, the pump coupler configured to couple pump light to an optical path that connects the first optical coupler and the second optical coupler.

12. The method of claim 11, further including forming an optical waveguide located over the surface, the optical waveguide configured to provide the optical path connecting the first optical coupler to the second optical coupler, wherein the pump coupler is connected to the waveguide between the ends thereof.

13. The method of claim 12, wherein the pump coupler is adjustable to vary an amount of pump light inserted into the connected optical waveguide.

14. The method of claim 13, further including forming a variable optical attenuator located along the optical waveguide.

15. The method of claim 12, further including forming an optical photodetector, the photodetector being configured to receive a portion of light from a core of the optical fiber.

16. The method of claim 12, further including forming a pump light source coupled to the pump coupler.

17. The method of claim 12, wherein the second optical coupler is an edge facet coupler.

18. The method of claim 13, wherein the optical waveguide is capable of amplifying light therein when optically pumped via the pump coupler.

19. The method of claim 12, further including locating an end of an optical core of an erbium-doped optical fiber proximate the first optical coupler such that the optical core is configured to receive pump light from the optical coupler.

20. The method of claim 12, further including coupling a laser pump source to the pump coupler, the laser pump source having an output wavelength to amplify optical signals in the telecommunications C or L band by Raman amplification.

* * * * *